United States Patent [19]
McClellan

[11] 3,748,733
[45] July 31, 1973

[54] INSULATION STRIPPER FOR CONDUCTORS
[76] Inventor: Walter R. McClellan, 1515 Nuuanu Ave., Honolulu, Hawaii 96817
[22] Filed: Oct. 18, 1971
[21] Appl. No.: 189,880

[52] U.S. Cl............... 30/90.1, 81/9.5 R, 7/5.5
[51] Int. Cl............................................ H02g 1/12
[58] Field of Search ............ 81/9.5 R, 9.5 C, 81/420; 7/5.4, 5.5, 5.6; 30/90.1

[56] References Cited
UNITED STATES PATENTS
| | | | |
|---|---|---|---|
| 3,394,742 | 7/1968 | Zoltai | 81/9.56 |
| 1,471,593 | 10/1923 | Davis | 81/9.5 R |
| 2,758,490 | 8/1956 | Williams | 81/9.5 R |
| 3,151,509 | 10/1964 | Gormley | 81/9.5 R |

Primary Examiner—Harold D. Whitehead
Assistant Examiner—Roscoe V. Parker
Attorney—James C. Wray

[57] ABSTRACT

The invention is a modification of a tool device such as hand pliers and the like and which is provided with means for stripping insulation from electrical conductors etc.

5 Claims, 5 Drawing Figures

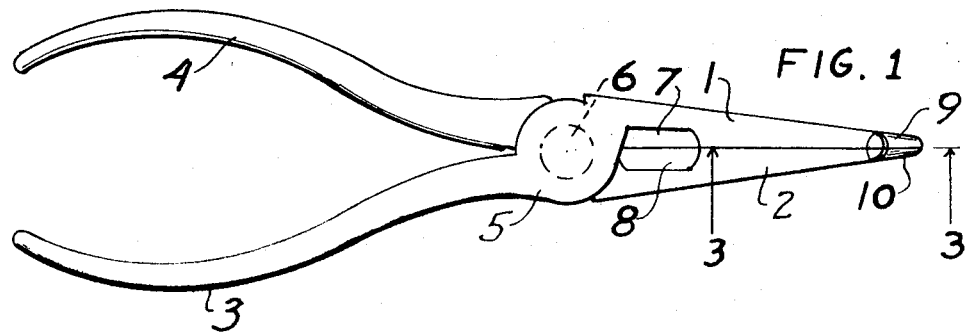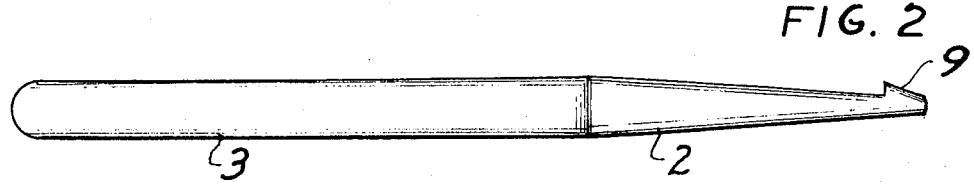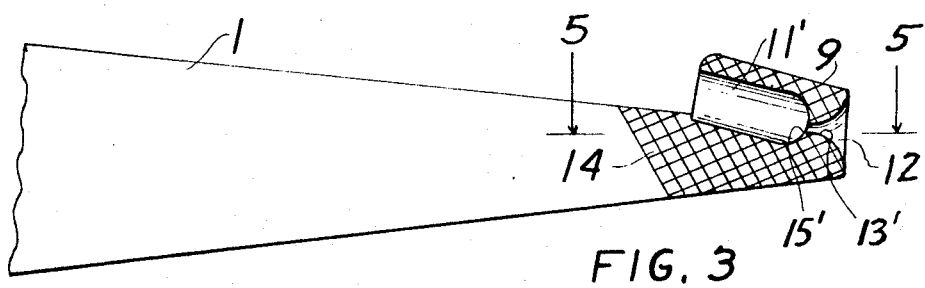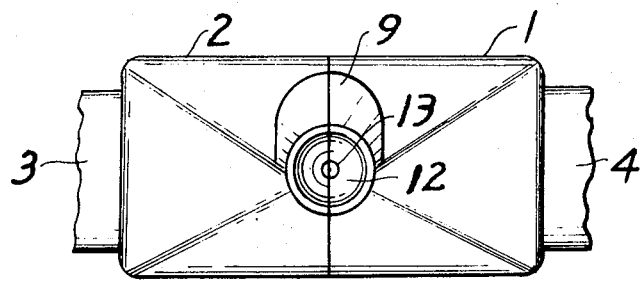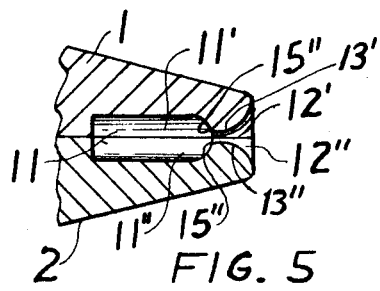

INSULATION STRIPPER FOR CONDUCTORS

The invention hereof concerns tools, fixed or portable, but is especially in combination with hand tools, and which tools are provided with a stripping means to remove insulation from electrical wires at the end portions thereof or anywheres between the ends of a wire. The stripping means is in combination with clamping jaw means adapted to firmly hold a wire in such a manner so that after a portion of the wire is stripped, the wire can be quickly and easily wrapped about a contact screw or binding post immediately after the stripping operation without disconnecting the tool or pliers from the wire.

One of the principal objects of the invention is to present an insulation stripping and/or cleaning means for wires and the like.

Another object is to provide a combination tool having means for holding and stripping insulation and also any debris upon a wire.

Other objects will become appartent upon careful inspection of the drawings and specifications.

In the drawings:

FIG. 1 is an elevational view of a typical hand plier showing the jaws thereof closed;

FIG. 2 is a bottom plan view of that shown in FIG. 1;

FIG. 3 is an enlarged elevational view of one jaw portion of the plers shown in FIG. 1 and taken along the line 3—3 thereof; the other jaw portion is of the same construction and arranged and formed to perfectly mate with the other jaw;

FIG. 4 is an enlarged front elevational view of the pliers;

FIG. 5 is a sectional view taken along the line 5—5 of FIG. 3.

In order to show and explain the invention, the particular hand pliers, as to style, has been selected, but it is to be understood that the invention can be applied to any kind of tool means whether it be a hand tool or attached to some part of a machine as a combination thereof. The invention is especially applied to the foreward end of a hand tool and used for stripping insulation from copper wires and the like, but may also be used for cleaning debris from bare wires etc.

As shown in the drawings, the hand tool is of a common variety having the cross members 3 and 4 with the long nosed jaws 1 and 2 which are integral with their respective curved handle portions. Each member has the well known hub-like portion 5 which is pivoted about a stud means 6. Each jaw has the complementary well known cutter means 7 and 8. At the forward end of each jaw there are the complementary protruding portions or wire guide means 9 and 10.

Each protruding portion 9 and 10 is arranged for complementary action and is mated in a manner so that when the portions are in closed condition as shown in FIG. 1, an elongated tunnel means 11 and an outwardly flared tunnel means 12 are formed. The two tunnel means are connected through a small opening or stripper bore 13. The elongated tunnel has halve portions indicated by the reference characters 11' and 11'' (see FIG. 5), and the reference characters 12' and 12'' indicate halves which form the flared tunnel means. Also, the small bore portions or halves can be found at 13' and 13''. And note that the inner surface of each jaw is ribbed at 14 so that an object can be firmly held between the jaws.

The size of the tunnels and especially the bore between them is measured to accommodate a particular gauged wire. The bore 13 is sized to snugly engage the bare wire without gripping it or cutting it and this bore 13 is sharp enough to cut through any insulation upon the wire that the bore 13 is designed to strip. As shown in FIG. 5 a circular cutter edge is formed by complementary semicircular edges 15' and 15'' at the junctions of tunnel parts 11' and 11'' with bore parts 13' and 13''. In actual operation, when jaws 1 and 2 are closed with an insulated wire in guides 9 and 10, bore 13 engages and compresses the insulation on the wire, gripping, stressing, deforming and weakening the insulation on the wire. When the clamped tool is pulled along the wire the insulation breaks at a line of stress. Further pulling slides or bunches the severed insulation along the wire, exposing a length of bare wire. The breaking by squeezing and pulling of the insulation avoids scoring and weakening of the wire in actual practice. By clamping the jaws 1 and 2 onto an insulated wire, at an end thereof, or at some intermediate portion thereof, the stripping is accomplished in a well known manner, that is, the wire is held in one hand as the stripper is pulled by the other hand.

Certain novel features and details of this invention are disclosed herein in order to make the invention clear in at least one form thereof. However, it is to be clearly understood that the invention as disclosed is not necessarily limited to the exact form and details disclosed since it is apparent that various modifications and changes may be made without departing from the spirit and scope of the invention as described and claimed.

Having thus described my invention, what is claimed and believed new and which is desired to be secured by Letters Patent is:

1. A hand tool wire insulation stripping and holding device having first and second integrally formed complementary handle-jaw members hinged by a stud pin, the members having distal jaw ends for clamping wires and the like, the jaw ends comprising a pair of complementary similar-shaped clamping parts, each part having a wire and insulation accomodating semicylindrical housing half which is adapted to be mated together with an opposite semicylindrical half to form a first tunnel means, each part having a substantially smaller diameter semicylindrical half to form with a complementary half in another clamping part a second tunnel means extending outward from the first tunnel means, a generally rectangular-walled circular cutter edge means formed at a junction of the first and second tunnel means, whereby when the jaw ends are closed about a wire and pulled along a wire the cutter means breaks and pulls insulation on the wire, whereby bare wire is exposed.

2. The tool device recited in claim 1 wherein the second tunnel means at its forward end remote from the first tunnel means has a curved, flared opening.

3. The tool device recited in claim 1 wherein the housing halves when mated provide a fin-like extension at distal jaw ends of the tool device.

4. The tool device recited in claim 1 wherein the pair of clamping parts are at the end of a pair of hand pliers.

5. The tool device recited in claim 1 wherein the second tunnel means is flared and wherein the clamping parts about the tunnel means are ribbed to prevent slipping of a wire and thus to hold the wire firmly so that it can be readily wrapped about a stud and the like.

* * * * *